(No Model.) 2 Sheets—Sheet 1.

D. B. ARNOLD.
ICE HARVESTING MACHINE.

No. 554,165. Patented Feb. 4, 1896.

WITNESSES
Severance
E. J. Fenwick

INVENTOR
David B. Arnold
by Raymond H. Dorsey
his Attorney (No Model.) 2 Sheets—Sheet 2.
D. B. ARNOLD.
ICE HARVESTING MACHINE.
No. 554,165. Patented Feb. 4, 1896.
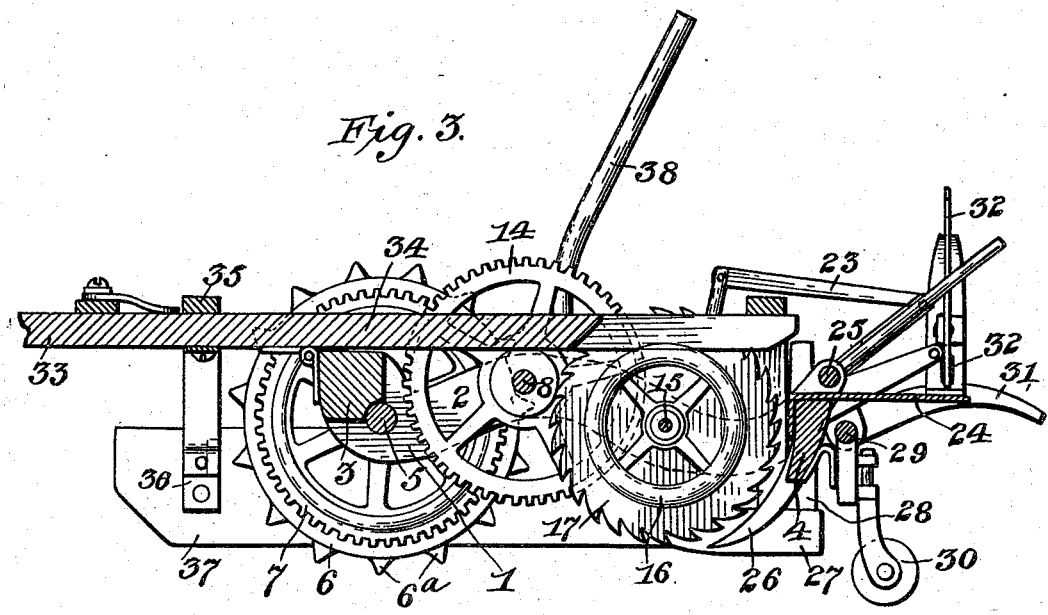
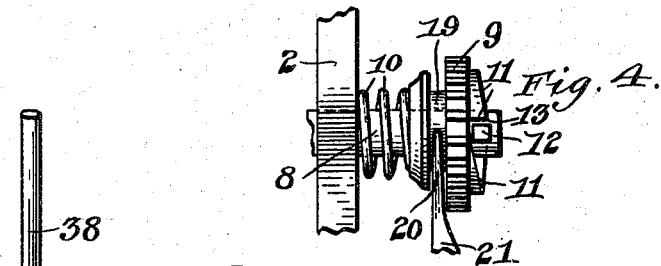
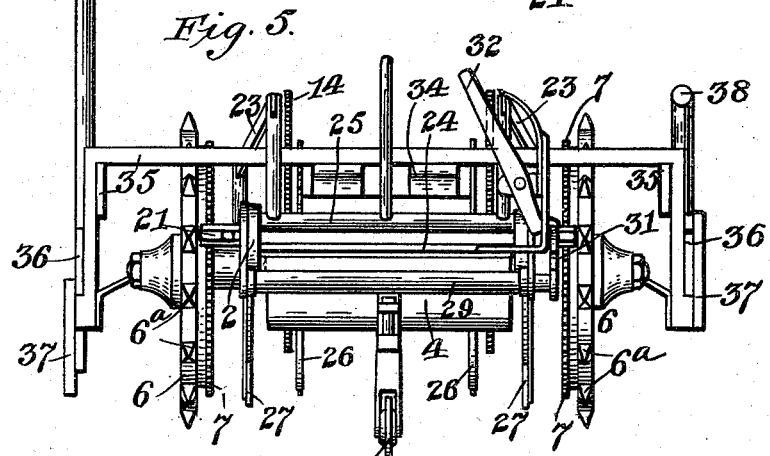
WITNESSES                                   INVENTOR

UNITED STATES PATENT OFFICE.

DAVID B. ARNOLD, OF TERRE HAUTE, INDIANA.

ICE-HARVESTING MACHINE.

SPECIFICATION forming part of Letters Patent No. 554,165, dated February 4, 1896.

Application filed January 9, 1895. Serial No. 534,326. (No model.)

*To all whom it may concern:*

Be it known that I, DAVID B. ARNOLD, a citizen of the United States, residing at Terre Haute, in the county of Vigo and State of Indiana, have invented certain new and useful Improvements in Ice-Harvesting Machines; and I do hereby declare the following to be a full, clear, and exact description of the invention, such as will enable others skilled in the art to which it appertains to make and use the same.

My invention has for its object to provide certain new and useful improvements in ice-harvesting machinery, whereby the ice may be rapidly cut into blocks of a predetermined size, and for this purpose circular saws suitably mounted on a wheeled frame and driven by the wheels thereof are used, so that as the machine is drawn over the field of ice the latter will be channeled by the circular saws.

This invention therefore consists in the construction and combination of the several parts of which it is composed, as will be hereinafter more fully described and claimed.

Figure 1:
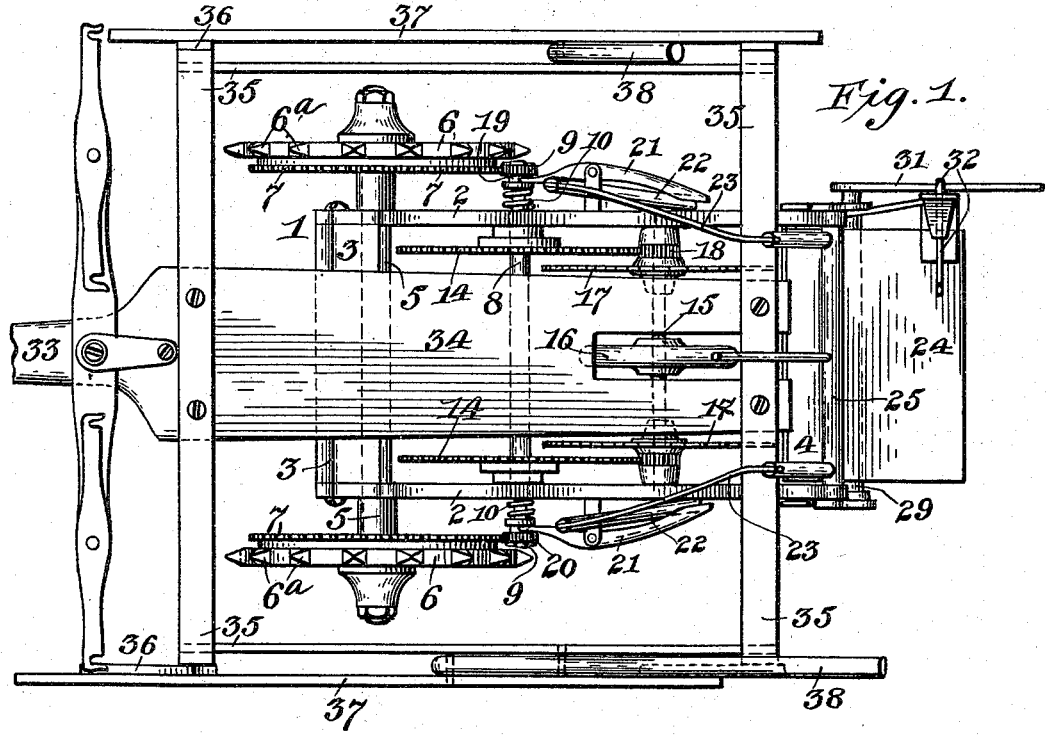
Figure 2:
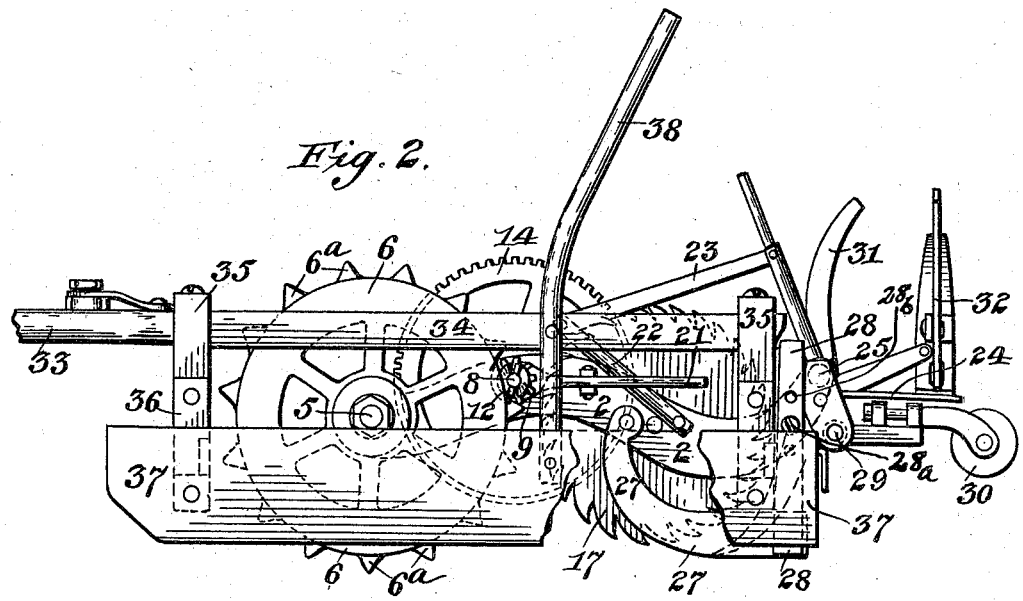

Referring to the accompanying drawings, in which corresponding parts are designated by similar marks of reference, Figure 1 is a plan view of an ice-harvesting machine constructed in accordance with this invention. Fig. 2 is a side view thereof. Fig. 3 is a vertical central longitudinal section thereof. Fig. 4 is a detailed view of the spring-clutch. Fig. 5 is a rear elevation.

The main frame 1 consists of parallel side bars 2, connected at their forward and rear ends by the transverse bars 3 and 4. An axle 5 passes through the forward ends of the bars 2 and projects upon each side of the frame formed thereby, upon which projecting ends of the axle the main wheels 6 are journaled. The tread of each of the wheels 6 is provided with peripheral teeth 6ª to engage the ice and to cause the said wheels to turn when the frame is moved. Upon the inner side of each of the wheels 6 and secured thereto is mounted a cog-wheel 7, the periphery of which lies inside of the tread of the adjoining wheel 6. A shaft 8 is mounted in the frame in the rear of and parallel with the axle 5, pinions 9 being mounted upon the opposite ends of the shaft 8 and being adapted to engage with the cog-wheel 7. The pinions 9 are free to move transversely upon the shaft 8, they being normally held upon the outer ends of the said shaft and in engagement with the cog-wheels 7 by the spiral spring 10 interposed between them and the side bars, 2.

Upon the outer face of each pinion is formed the cam-shoulders 11, which are adapted to engage the pins 12, which pass through the shaft—that is to say, the pinions are normally pressed outwardly by the springs, and the shoulders 11 therefor bear upon the pins 12 and by engagement of their forward faces 13 with the pins 12 they are held against rotating upon the shaft 8 when the wheels 6 are rotated by the forward movement of the device. If, however, the device be backed, it will be noticed that the shoulders 11 will slide upon the pins 12, and that the pinions will be moved in, compressing the spiral springs and placing them out of engagement with the pins 12, whereby such rearward motion of the wheels 6 and of the pinions 9 will be entirely independent of the motion of the shaft 8. Cog-wheels 14 are mounted upon the shaft 8, upon each end thereof, adjacent to the inner side of each of the side bars 2, while a saw-shaft 15 is mounted in the frame behind the said shaft 8 and is provided with a central fly-wheel 16 and a circular saw 17 at its each end, the hub of each of the said saws being provided with a pinion 18 engaging with the corresponding cog-wheel 14. It will thus be seen that the forward movement of the frame will cause the main wheels 6 to rotate, which motion will be transmitted through the pinions 9, shaft 8, cog-wheels 14 to the saws 17; that the direction of rotation of the saws is the same as that of the wheels, and that owing to the respective diameters of the pinions 9 and 18 and of the cog-wheels 7 and 14 the rotation of the saws is very rapid in respect to the rotation of the main wheel 6, thereby causing the ice to be rapidly channeled under the action of the teeth of the saws. It will also be seen that when the wheels 6 are rotated by a backward movement of the vehicle, such motion is not transmitted to the shaft 8, it being stopped at the clutch mechanism.

In order to permit the movement of the vehicle upon the wheels 6 from place to place without causing the unnecessary rotation of the saws, each of the pinions 9 is provided with an annular groove 19, in which projects the fingers 20, formed upon the one end of a lever 21, which is centrally pivoted to a side of the frame. The opposite end of the said lever is normally in contact with an arm 22 pivoted to the frame and adapted to be moved by its connection 23 with a rocking shaft 25 mounted in the rear of the frame 1 and adjacent to the platform 24, provided for the support of the operator. It will thus be seen that by moving the arms 22 rearwardly, which can be simultaneously done by the corresponding motion of the rocking shaft 25, the rear ends of the levers 21 will be forced outwardly and the fingers 20, and with them the pinions 9, will be moved in and out of engagement with the cog-wheels 7, the spiral springs 10 being compressed. The saws are thus thrown out of gear, but upon the reverse movement of the rocking shaft 25, the levers 21 being left free, the pinions 9 will be again shoved outwardly by the springs.

Followers 26 are mounted upon the rear transverse beam 4 of the frame, in the same plane with the saws, and by following the saws in the channel formed thereby serve to remove the chips and débris formed thereby. A runner 27 is pivoted at its forward end to each of the side bars 2 and has its rear end pivoted to the vertical post 28, which is adapted to be adjustably clamped to the rear portion of the corresponding side bar by means of bolts 28$^a$ passing through the side bar and adapted to be inserted in any of the series of perforations 28$^b$ in the vertical post, so that the adjustment of this vertical post determines the position of the runner, and thus of the depth of cut of the saws, as the runners by bearing upon the surface of the ice prevent the further action of the latter.

To provide for the transportation of the vehicle and to raise the saws from off the ground, a lower rocking shaft, 29, is mounted in the rear of the frame 1 and has secured thereto the caster-wheel 30, which by the movement of the rocking shaft can be caused to bear upon the ground and to lift the frame. The necessary motion of the shaft can be given by the lever 31, which is adapted to be engaged by the locking-lever 32 to be retained in the position in which the caster-wheel bears upon the ground.

The tongue 33 and its rearward extension 34 are hinged to the forward cross-piece or transverse bar 3 of the frame 1, so that this frame and the parts carried thereby may be as free as possible for the motion of the draft-animals. A skeleton platform 35 is carried by the extension of the tongue 33 and has hung from each of its opposite sides by means of links 36 a guide 37, the said guides being adapted to be raised or lowered by the levers 38. As these guides are intended to serve as a means for guiding the movements of the vehicle by engaging in or following the channel cut by the saws on the preceding trip of the machine, the distance from them to the adjoining saw is, by preference, equal to the distance between the saws, thereby insuring the cutting of blocks of equal size.

Having thus described my invention, what I claim, and desire to secure by Letters Patent of the United States, is—

In an ice-harvesting machine, the combination with supporting-wheels having cog-wheels thereon, of a frame having its forward end supported by the said supporting-wheels, curved runners having their forward ends pivoted to the middle portion of the frame, pieces 28 pivoted to the rear ends of the runners and adjustably connected to the rear end of the frame, a shaft mounted in the said frame, pinions longitudinally movable upon the shaft and provided with cams upon their outside faces, and adapted to engage the gear-wheels, pins upon the shaft adapted to engage the cams upon the pinions upon a rotation in one direction and to move the pinions longitudinally upon the shaft upon a rotation in the opposite direction, springs tending to throw the pinions into engagement with the pins and cog-wheels, means for moving the pinions against the springs, saws mounted in the frame in the rear of the wheels and driven by the shaft, curved followers behind the saws and running in the cuts made thereby, a rocking shaft provided with a caster-wheel, mounted in the rear of the frame, a tongue and extension pivoted to the frame above the supporting-wheels, and vertically-adjustable guides carried by the said extension, substantially as described.

In testimony whereof I affix my signature in presence of two witnesses.

DAVID B. ARNOLD.

Witnesses:
SAMUEL M. CRANDELL,
PETER M. FOLEY.